Dec. 11, 1928.
J. M. JOHANSEN
1,694,545
COMBINED MILKING STOOL AND BUCKET
Filed Jan. 16, 1928
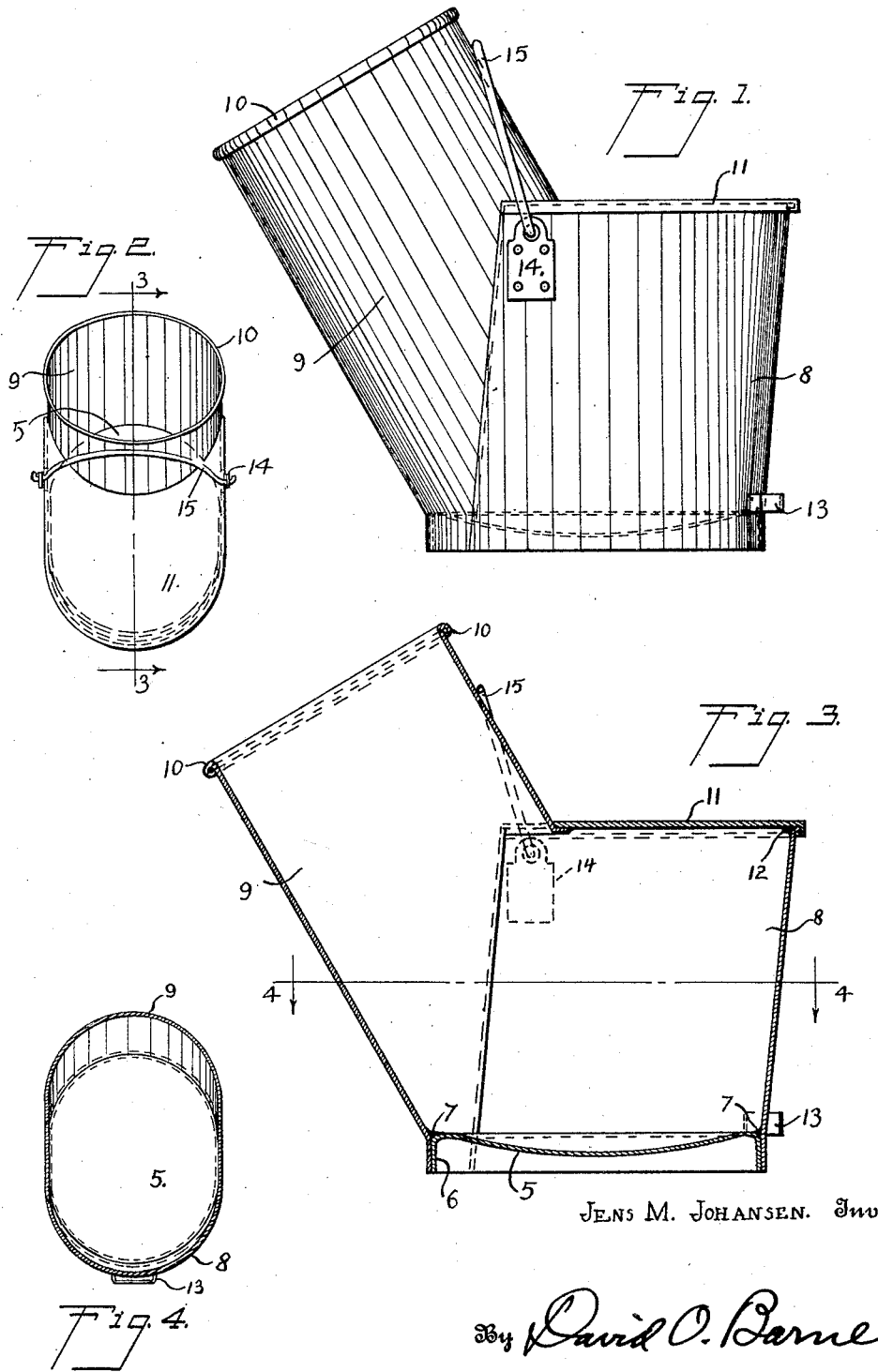
Jens M. Johansen. Inventor
By David O. Barnell
Attorney Patented Dec. 11, 1928.

1,694,545

UNITED STATES PATENT OFFICE.

JENS M. JOHANSEN, OF OMAHA, NEBRASKA.

COMBINED MILKING STOOL AND BUCKET.

Application filed January 16, 1928. Serial No. 247,052.

My invention relates to dairy appliances, and particularly to devices for facilitating milking and the sanitary handling of milk. It is the object of my invention to provide a simple, convenient, inexpensive and sanitary bucket or receptacle for receiving milk as it is drawn from the cows, the bucket being formed to facilitate the work of the dairyman, disposing the mouth of the vessel in convenient proximity to the udder, reducing to a minimum the probability of the milk being contaminated, or spilled and wasted by overturning of the vessel during the milking of the cows, and providing also a convenient seat or stool for use of the dairyman during the milking.

In the accompanying drawings Fig. 1 is a side view of a structure embodying my invention, Fig. 2 is a plan view of the same, Fig. 3 is a longitudinal vertical section on the line 3—3 of Fig. 2, and Fig. 4 is a detail horizontal section on the line 4—4 of Fig. 3.

In carrying out my invention I construct the bucket or milk receptacle from heavy sheet-metal, which is tinned or otherwise protectively coated to prevent corrosion. The bottom member 5 is oval in form, centrally concaved at its upper side, and has at its edges a continuous downwardly extended flange or rim 6, about which the lower portions of the side-walls of the vessel are snugly fitted and secured by soldering, care being exercised that the inner corners are filled with the solder to form a rounding fillet 7 which may be easily cleaned. The side-walls which are joined to the bottom-rim 6, as above described, are formed principally by the body 8, which extends about the sides and the rear end of the bottom-member 5, the side-wall at the front end of the bottom-member being formed by the lower portion of the neck-portion or spout 9 of the vessel. The body 8 is formed to extend up substantially vertically from the sides of the bottom-rim, but at the rear end may be slightly flared, to overhang the bottom, as shown. The neck-portion or spout 9 is substantially cylindrical, or circular in transverse section, its diameter being substantially equal to the width of the bottom 5, the cylindrical axis extending diagonally forward and upward from the plane of the bottom, and the upper end of the spout being in a diagonal plane transverse to said cylindrical axis. Said upper end of the spout is preferably rolled and wired, to form a smooth, reinforced, annular rim 10, of which the lowest portion is above the level of the upper edge of the body 8. The spout is seamed to the body 8 at its lines of juncture therewith, and its rear portion terminates at the plane of the upper edge of the body. A cover 11 is permanently affixed to the upper edge of the body 8 and to the adjacent rearward portion of the spout, the joints being made fluid-tight by solder, which is formed into fillets 12 at the inner corners, to facilitate cleansing. A handle 13 is secured to the rear side of the body 8 adjacent to the bottom-rim. Bail-lugs 14 are secured to the sides of the body at the upper forward portion thereof, and a bail 15 is connected pivotally with said lugs, the form of the bail being such that it may normally rest against the rear side of the spout as shown in Figs. 1 and 3, and the position of the bail-lugs being so related to the center of gravity of the vessel that when the latter is supported by the bail the body will be tilted rearwardly, the axis of the spout approximating a vertical position, and the mouth or rim 10 approaching a horizontal plane.

In the construction of the described vessel, the body 8 and spout 9 are first seamed together, then the cover 11 is applied and permanently affixed thereto, the soldering of the inner corners and the formation of the fillets 12 being readily effected through the open bottom of the body, and lastly the bottom-member 5 is inserted and permanently secured to the side walls, the soldering of the bottom-joint and the formation of the fillet 7 being effected from the inside of the vessel by working through the open end of the spout.

It will be seen that the provision of the spout having a diameter substantially equal to the width of the body of the vessel, facilitates the construction thereof, and also provides access to the interior of the vessel, such that the same may be effectively cleansed and maintained in a sanitary condition. As a further result of such proportioning of the spout, the vertical extent thereof at its juncture with the body is equal to the entire height of the latter, and the vessel, while being fully accessible interiorly, may be substantially integral or of permanently united parts, having no loose or separable parts except the bail, having no joints or crevices subject to contamination or difficult to cleanse, and being, as a whole, strong, durable and comparatively inexpensive to manufacture. The vessel in general is so proportioned that when it is placed upon the floor, with the mouth of the spout in proximity to the udder of a cow, the cover 11 of the body forms a convenient seat or stool for the dairyman, who may sit thereon, straddling the spout, which extends up between the knees so that streams of milk from the teats may be directed into the same without effort or special attention to the direction of the streams. By its use as a seat or stool, the vessel is held firmly to prevent its overturning by kicking or other movements of a fractious cow; and should the animal change position slightly at any time during the milking, the milker may adjust the position of the vessel without interrupting the use of the hands upon the udder. Such adjustment of position of the vessel is effected by slightly tilting the same and then swinging the spout laterally, or, by clamping the spout between the knees, and momentarily raising his weight from the seat, the milker may slide the entire vessel forward or backward, as may be required to keep the mouth 10 of the spout in proper relation to the udder. Should the vessel be filled with milk to its maximum capacity, or slightly above the level of the cover 11, and be then lifted by means of the bail, the tilting of the body, due to the off-center position of the bail-axis, causes the liquid in the spout to assume a level considerably below the mouth or rim 10 thereof, and thus prevents spilling or waste. The handle 13 is used for tilting the vessel toward the spout to pour the contents therefrom.

Now, having described my invention, what I claim and desire to secure by Letters Patent is:

In a combined milking stool and bucket, an upright oval body of sheet-metal having a cover and bottom permanently affixed to the upper and lower ends thereof respectively, and a substantially cylindrical sheet-metal spout of a diameter substantially equal to the width of the body and having its lower rear portion affixed to the body to form continuous side-walls therewith, said spout extending diagonally upward and forward from the body, the upper end of the spout being above the level of the body-cover, and the vertical extent of the line of junction between the spout and body being equal to the entire height of the body.

JENS M. JOHANSEN.